United States Patent [19]
Hall

[11] Patent Number: 4,478,659
[45] Date of Patent: Oct. 23, 1984

[54] METHOD OF JOINING SHEETS OF A NON-MAGNETIC MATERIAL TOGETHER

[76] Inventor: Alethea R. M. Hall, 22 Park Rd., Bordeaux, Randburg, Transvaal, South Africa

[21] Appl. No.: 442,252

[22] Filed: Nov. 17, 1982

[30] Foreign Application Priority Data

Nov. 24, 1981 [ZA] South Africa ............... 81/8148

[51] Int. Cl.³ .............. B29C 27/08; B30B 15/30; B30B 31/20
[52] U.S. Cl. .................. 156/73.1; 100/917; 156/197; 156/290; 156/308.4; 156/553; 156/580.1; 156/583.1; 226/196
[58] Field of Search ........... 156/73.1, 93, 290, 308.4, 156/197, 553, 580.1, 583.1, 549, 515, 274.6, 380.1, 380.3; 226/93, 196; 100/917; 269/8

[56] References Cited

U.S. PATENT DOCUMENTS

| | | | |
|---|---|---|---|
| 3,413,915 | 12/1968 | Goodwin et al. | 100/917 |
| 3,739,129 | 6/1973 | Miller | 156/274.6 |
| 3,948,705 | 4/1976 | Ausnit | 156/580.1 |
| 4,094,729 | 6/1978 | Boccia | 156/515 |

Primary Examiner—Michael Wityshyn
Attorney, Agent, or Firm—Stevens, Davis, Miller & Mosher

[57] ABSTRACT

A method of joining two sheets of a non-magnetic material e.g. a plastics material, together along a join line comprises the steps of locating the sheets in a zone between a magnet and a body which is attracted by the magnet to bring the sheets together, causing the sheets to be moved through the zone either by moving the sheets or by moving the magnet and body, and joining the sheets together e.g. by heat or ultrasonic welding, in the zone or immediately after the sheets have passed through the zone. Apparatus for use in this method is also disclosed.

17 Claims, 2 Drawing Figures

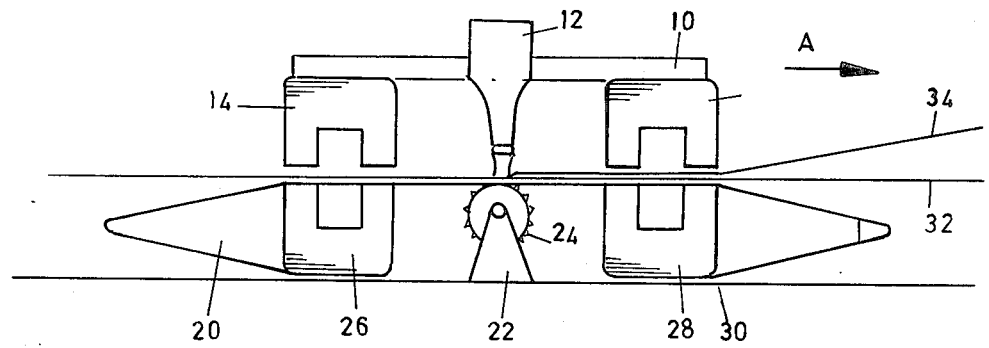
FIG_1
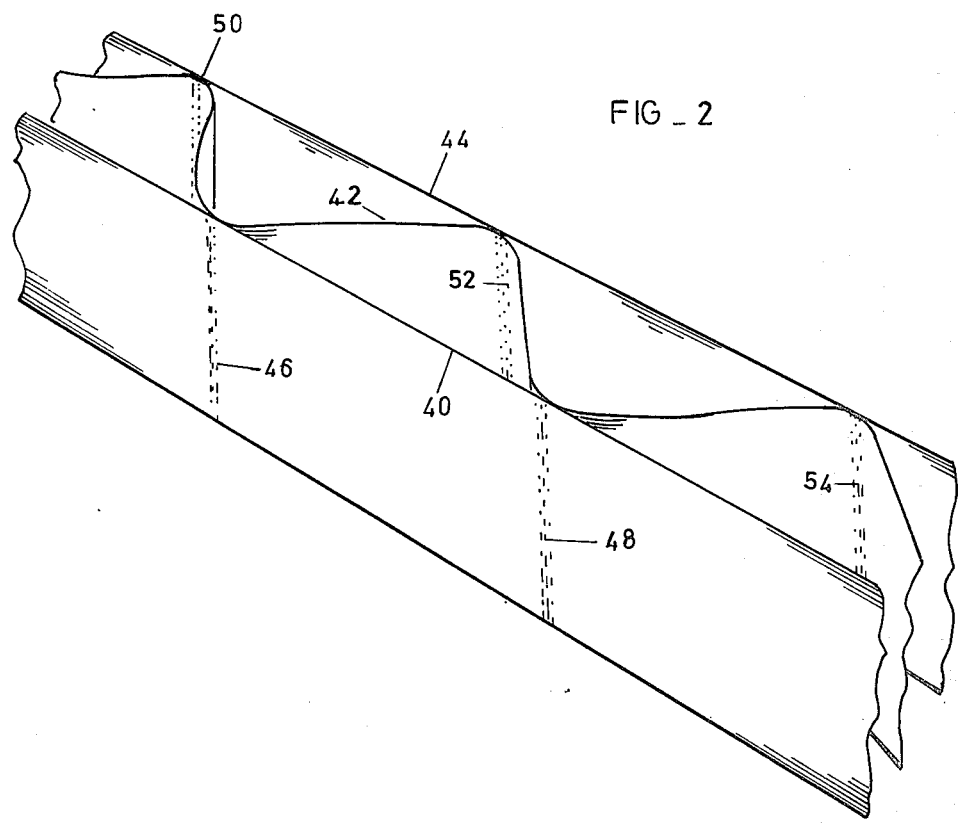
FIG_2

METHOD OF JOINING SHEETS OF A NON-MAGNETIC MATERIAL TOGETHER

BACKGROUND OF THE INVENTION

This invention relates to a method of joining sheets of a non-magnetic material to one another and to apparatus for use in such a method.

In many applications, such as road stabilization and filter beds it is necessary to use a product having a honeycomb structure. For example, it is known to make temporary road surfaces by laying down on the ground a length of glued Kraft paper having a honeycomb structure and then filling the structure with sand. The use of glued Kraft paper has the disadvantage that it disintegrates when it gets wet. It is clearly desirable to use in place of the Kraft paper a plastics material which will not deteriorate in wet conditions. However, up to now no method of forming a honeycomb structure of plastics material, which is economically viable, has been known. In addition, there are other applications where the use of a honeycomb or similar structure made of a plastics material would be desirable.

SUMMARY OF THE INVENTION

According to the invention there is provided a method of joining two sheets of a non-magnetic material together along a join line comprising the steps of:
 (a) locating the sheets in a zone between a magnet and a body which is attracted by the magnet to bring the sheets together;
 (b) causing the sheets to be moved through the zone; and
 (c) joining the sheets together in the zone or immediately after the sheets have passed through the zone.

According to another aspect of the invention there is provided a method of joining a first sheet of two sheets of a non-magnetic material which are joined to each other along a join line, to a third sheet of a non-magnetic material along a join line comprising the steps of:
 (a) locating the three sheets close to a magnet with the third sheet adjacent the first sheet;
 (b) locating a body which is attracted by the magnet between the first sheet and the second sheet so that the first sheet and the third sheet are brought together in a zone between the magnet and the body with the second sheet below the body;
 (c) causing the first sheet and the third sheet to be moved through the zone; and
 (d) joining the third sheet to the first sheet in the zone or immediately after the third sheet and the first sheet have passed through the zone to form the join line.

Preferably, the first sheet and the second sheet are joined to each other along two substantially parallel join lines and the third sheet is joined to the first sheet along a join line which is intermediate the join lines of the first and second sheets.

The non-magnetic material is preferably a plastics material.

The sheets may be joined to each other by means of sewing or glueing or preferably, heat welding or ultrasonic welding.

The sheets to be joined to each other are preferably located in a zone between a pair of magnets on the one hand, and a body which is attracted by the magnets, e.g. another magnet, on the other hand, and the sheets are joined to each other at a point between the two magnets.

The sheets may be caused to be moved through the zone either by moving the sheets with the magnet and the body remaining stationary, or by moving the magnet and hence the body, with the sheets remaining stationary.

According to a further aspect of the invention there is provided apparatus for use in a method of joining two sheets of a non-magnetic material together along a join line comprising a magnet and a body which is attracted by the magnet defining between them a gap in which the sheets may be located, and joining means such as a heat or ultrasonic welding head located immediately after the gap for joining the sheets together.

BRIEF DESCRIPTION OF THE DRAWINGS

FIG. 1 is a schematic view of apparatus for use in the method of the invention; and FIG. 2 is a perspective view of a product made according to the method of the invention.

DESCRIPTION OF PREFERRED EMBODIMENTS

Referring to FIG. 1, apparatus for use in welding sheets of a non-magnetic weldable material together comprises an upper welding unit 10 and a lower welding unit or carriage 20. The upper welding unit 10 comprises a welding head 12 and two magnets or electromagnets 14 and 16. The upper welding unit 10 is mounted on a gantry (not shown) so that it can traverse the length of the sheets to be welded. Mounted on the carriage 20 is a welding anvil 22 having a knurled or serrated wheel 24 and two magnets 26 and 28. The magnets 26 and 28 are attracted to the magnets 14 and 16 thus bringing the welding anvil 22 into the required proximity of the welding head 12.

In use, two sheets of a non-magnetic weldable material are first welded together. The sheets are located between the upper welding unit 10 and the carriage 20. The magnetic flux from the magnets 14 and 16 penetrates the two sheets of material and attracts the magnets 26 and 28 thus bringing the welding anvil 22 into the required proximity of the welding head 12. The serrated wheel 24 ensures that the two sheets of material are brought into sufficiently close contact with the welding head 12. Once welding is commenced the gantry which carries the upper welding unit 10 is moved down a desired path so that a weld line is formed between the two sheets of material. The magnetic attraction between the magnets 14 and 16 and the magnets 26 and 28 causes the carriage 20 to move as the gantry is moved. Thus the welding anvil 22 is kept continuously in welding contact with the welding head 12. The amount of pressure between the welding head 12 and the welding anvil 22 can be varied by using different magnets or by altering the electromagnetic field when electromagnets are used.

Once the desired weld line between the two sheets of material has been formed, a third sheet of material may be welded to one of the first two sheets. This is illustrated in FIG. 1. Two sheets of material 30 and 32 are welded to each other as described above along a weld line which is parallel to the plane of the paper. The carriage 20 is then located between the two sheets 30 and 32 so that the sheet 30 passes below the carriage 20 and the sheet 32 passes between the carriage 20 and the upper welding unit 10. A third sheet of material 34 is located on top of the sheet 32 between the upper welding unit 10 and the carriage 20. Welding is commenced and the gantry is moved in the direction of arrow A to form a weld line between the sheets 32 and 34, which is parallel to the weld line formed between the sheets 30 and 32. Once this second weld line has been formed, a fourth sheet of material may be welded to the sheet 34 or sheet 30 in the same manner and so on.

Multiple parallel weld lines between two sheets of material may be formed simultaneously by mounting a plurality of upper welding units in tandem on the gantry. Each upper welding unit will be associated with its own lower welding unit or carriage.

The method of welding may be any known method such as ultrasonic welding or heat welding.

As an alternative, the carriage 20 may be made of a material which is attracted to the magnets 14 and 16 and then the magnets 26 and 28 may be omitted.

In FIG. 2 there is shown a product made by the method of the invention. It comprises three sheets 40, 42 and 44 of a weldable material, the sheets 40 and 42 being welded to each other along the weld lines 46 and 48 and the sheets 42 and 44 being welded to each other along the weld lines 50, 52 and 54 to form a honeycomb structure.

The weldable material may be any suitable material such as a woven or non-woven thermoplastic material, for example, woven or non-woven polypropylene fabric.

The honeycomb product described above has many uses. it can be used to form temporary road surfaces by laying a length of the product on the ground and filling the interstices in the honeycomb structure with sand. It can be used in a similar manner to form a trickle bed filter medium for water purification works and to form an extraction filter bed for bacterial mineral flotation. Other applications of the product include packaging, heat insulation, sound insulation, filling of cavities (e.g. doors) and strengthening of concrete.

The method of the invention may also be used to form other types of product comprising a weldable material. For example, it is known to use plastic sheets to form dam liners. These liners are constructed by laying sheets of a plastic material on the floor or base of the dam and then joining the sheets together. As the base of the dam is often uneven, it is difficult to obtain a smooth unpuckered join line between the sheets, which may cause leakage later. However, using the method of the invention, it is possible to obtain smooth strong join or weld lines between adjacent sheets as the sheets do not rest on the dam base when being joined. Clearly there are also many other applications of the method of the invention for joining sheets of material together in situ.

I claim:

1. A method of joining two sheets of a non-magnetic material together along a join line comprises the steps of:
   (a) locating the sheets in a zone between a magnet and a body which is attracted by the magnet to bring the sheets together;
   (b) causing the sheets to be moved through the zone; and
   (c) joining the sheets together in the zone or immediately after the sheets have passed through the zone.

2. A method according to claim 1 wherein the non-magnetic material is a plastic material.

3. A method according to claim 2 wherein the sheets are joined to each other by heat welding or by ultrasonic welding.

4. A method according to claim 1 wherein the sheets to be joined to each other are located in a zone between a pair of magnets on the one hand, and a body which is attracted by the magnets on the other hand, and the sheets are joined to each other at a point between the two magnets.

5. A method according to claim 1 wherein the body comprises a magnet.

6. A method according to claim 1 wherein the sheets are caused to be moved through the zone by moving the sheets with the magnet and the body remaining stationary.

7. A method according to claim 1 wherein the sheets are caused to be moved through the zone by moving the magnet and hence the body, with the sheets remaining stationary.

8. A method of joining a first sheet of two sheets of a non-magnetic material which are joined to each other along a join line, to a third sheet of a non-magnetic material along a join line comprises the steps of:
   (a) locating the three sheets close to a magnet with the third sheet adjacent the first sheet;
   (b) locating a body which is attracted by the magnet between the first sheet and the second sheet so that the first sheet and the third sheet are brought together in a zone between the magnet and the body with the second sheet below the body; p1 (c) causing the first sheet and the third sheet to be moved through the zone; and
   (d) joining the third sheet to the first sheet in the zone or immediately after the third sheet and the first sheet have passed through the zone to form the join line.

9. A method according to claim 8 wherein the first sheet and the second sheet are joined to each other along two substantially parallel join lines and the third sheet is joined to the first sheet along a join line which is intermediate the join lines of the first and second sheets.

10. A method according to claim 8 wherein the non-magnetic material is a plastics material.

11. A method according to claim 10 wherein the sheets are joined to each other by heat welding or by ultrasonic welding.

12. A method according to claim 8 wherein the sheets to be joined to each other are located in a zone between a pair of magnets on the one hand, and a body which is attracted by the magnets on the other hand, and the sheets are joined to each other at a point between the two magnets.

13. A method according to claim 8 wherein the body comprises a magnet.

14. A method according to claim 8 wherein the sheets are caused to be moved through the zone by moving the sheets with the magnet and the body remaining stationary.

15. A method according to claim 8 wherein the sheets are caused to be moved through the zone by moving the magnet and hence the body, with the sheets remaining stationary.

16. Apparatus for use in a method of joining two sheets of a non-magnetic material together along a join line comprises a magnet and a body which is attracted by the magnet defining between them a gap in which the sheets may be located, and joining means located immediately after the gap for joining the sheets together.

17. Apparatus according to claim 16 wherein the joining means comprises a heat or ultrasonic welding head.

* * * * *